(12) United States Patent
Weingaertner et al.

(10) Patent No.: US 10,847,824 B2
(45) Date of Patent: Nov. 24, 2020

(54) FUEL CELL SYSTEM INCLUDING HIGH-TEMPERATURE DESULFURIZATION SUBSYSTEM AND METHOD OF OPERATING THE SAME

(71) Applicant: BLOOM ENERGY CORPORATION, Sunnyvale, CA (US)

(72) Inventors: David Weingaertner, Sunnyvale, CA (US); Emad El Batawi, Mountain View, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 166 days.

(21) Appl. No.: 16/130,547

(22) Filed: Sep. 13, 2018

(65) Prior Publication Data

US 2020/0091531 A1  Mar. 19, 2020

(51) Int. Cl.
*H01M 8/0662* (2016.01)
*H01M 8/04014* (2016.01)
*B01D 53/04* (2006.01)

(52) U.S. Cl.
CPC .......... *H01M 8/0675* (2013.01); *B01D 53/04* (2013.01); *H01M 8/04014* (2013.01); *B01D 2253/1124* (2013.01); *B01D 2257/30* (2013.01)

(58) Field of Classification Search
CPC combination set(s) only.
See application file for complete search history.

(56) References Cited

U.S. PATENT DOCUMENTS

| | | | |
|---|---|---|---|
| 6,951,635 B2 | 10/2005 | Gangwal et al. | |
| 8,440,362 B2 | 5/2013 | Richards et al. | |
| 9,755,263 B2 | 9/2017 | Trevisan et al. | |
| 9,859,580 B2 | 1/2018 | Ballantine et al. | |
| 2002/0018738 A1* | 2/2002 | Woods | B01J 8/0278 422/600 |
| 2005/0022449 A1* | 2/2005 | Katikaneni | B01D 53/48 48/198.3 |
| 2005/0070430 A1 | 3/2005 | Gangwal et al. | |

(Continued)

FOREIGN PATENT DOCUMENTS

| | | |
|---|---|---|
| JP | 2008115309 A | 5/2008 |
| JP | 2017025118 A | 2/2017 |
| KR | 20090067428 A | 6/2009 |

OTHER PUBLICATIONS

R. Gupta, "High-Temperature Suflur Removal in Gasification Applications," Center for Energy Technology, RTI International, Aug. 23, 2007.

(Continued)

*Primary Examiner* — Christopher P Domone
(74) *Attorney, Agent, or Firm* — The Marbury Law Group PLLC

(57) ABSTRACT

A fuel cell system includes a hot box, a stack of fuel cells disposed in the hot box, and a desulfurization subsystem. The desulfurization subsystem may include a sulfur adsorption reactor containing a metal oxide, such as ZnO, configured to adsorb sulfur species from fuel, a first fuel conduit configured to provide fuel to the reactor, and a second fuel conduit configured to receive fuel from the reactor. The desulfurization subsystem may be configured to heat the reactor to an operating temperature ranging from about 200° C. to about 450° C., using heat generated in the hot box.

14 Claims, 7 Drawing Sheets

(56) References Cited

U.S. PATENT DOCUMENTS

| | | | |
|---|---|---|---|
| 2010/0203417 A1* | 8/2010 | Venkataraman | C01B 3/48 |
| | | | 429/465 |
| 2012/0021305 A1* | 1/2012 | Nagayasu | C10G 25/003 |
| | | | 429/410 |
| 2012/0189940 A1 | 7/2012 | Richards et al. | |
| 2014/0272612 A1 | 9/2014 | Trevisan et al. | |
| 2015/0194685 A1 | 7/2015 | Ballantine et al. | |
| 2017/0098842 A1 | 4/2017 | Trevisan et al. | |
| 2017/0331133 A1 | 11/2017 | Trevisan et al. | |

OTHER PUBLICATIONS

"Diesel Emission Control Sulfur Effects (DECSE) Program," Phase I Interim Data, 58 pages, (1999).

Skinner, S. J. et al., "Oxygen Ion Conductors," Materials Today, pp. 30-37, (2003).

U.S. Appl. No. 16/140,017, filed Sep. 24, 2018, Bloom Energy Corporation.

Notification of Transmittal of the International Search Report and Written Opinion of the International Search Authority for International Patent Application No. PCT/US2019/049452, dated Dec. 26, 2019, 12 pages.

Copeland, R. J. et al., "Long life ZnO—TiO2 and Novel Sorbents", Conference: Advanced Coal-Fired Power Systems 1996 Review Meeting, Dec. 31, 1996 (Publication date), Report No. DOE/ER/81881-97/C0746, Internal pp. 1-13, (1996).

\* cited by examiner

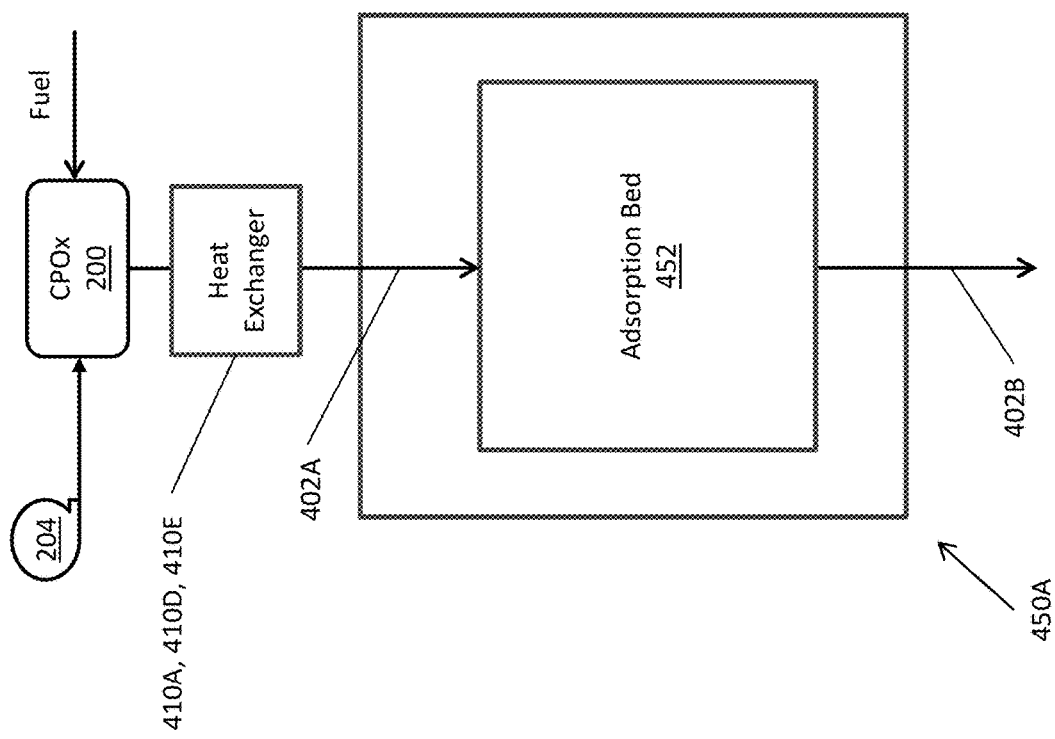

FUEL CELL SYSTEM INCLUDING HIGH-TEMPERATURE DESULFURIZATION SUBSYSTEM AND METHOD OF OPERATING THE SAME

BACKGROUND

Field

Aspects of the present disclosure relate to fuel cell systems, such as solid oxide fuel cell (SOFC) systems including high-temperature desulfurization subsystems.

DESCRIPTION OF THE BACKGROUND

Fuel cells, such as solid oxide fuel cells (SOFC's), are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

The reliability of fuel cell systems, such as a solid oxide fuel cell (SOFC) system, greatly depends on the presence and concentration of contaminants in the fuel stream. Contaminants, such as moisture, oxygen, siloxanes, and sulfur (including sulfur compounds), may degrade the fuel cell stack's performance and cause irreversible damage resulting in decrease efficiencies and costly replacement. Specifically, when using natural gas as a fuel, fuel cell systems require desulfurization. Passing fuel through desulfurizer sorbent beds is one way to remove sulfur and sulfur compounds from fuel prior to use in a fuel cell.

However, the sorbent beds (e.g., absorbent and/or adsorbent beds) have a finite life and once the sorbent bed is exhausted, sulfur may pass through the sorbent bed without being adsorbed and reach the fuel cell stack, causing permanent damage. Even if sorbent beds are replaced prior to exhaustion, there may be underutilized portions of the sorbent bed increasing the cost of sorbent bed replacement.

SUMMARY

According to various embodiments, provided is a fuel cell system including: a hot box; a stack of fuel cells disposed in the hot box; and a desulfurization subsystem comprising: a sulfur adsorption reactor comprising a metal oxide configured to adsorb sulfur species from fuel; a first fuel conduit configured to provide fuel to the reactor; a second fuel conduit configured to receive fuel from the reactor. The subsystem may be configured to heat the reactor to an operating temperature ranging from about 200° C. to about 450° C., using heat generated in the hot box.

According to various embodiments, provided is a method of operating a fuel cell system comprising a hot box, a stack of fuel cells disposed in the hot box; and a desulfurization subsystem comprising a high-temperature desulfurization reactor, the method comprising: heating the reactor to an operating temperature ranging from about 200° C. to about 450° C., using heat generated in the hot box; and removing sulfur species from a fuel inlet stream provided to the fuel cells using the heated reactor.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIGS. 6A and 6B are schematic views of high-temperature desulfurization reactors, according to various embodiments of the present disclosure.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. In some embodiments, a value of "about X" may include values of +/−1% X. It will be further understood that the endpoints of each of the ranges are significant both in relation to the other endpoint, and independently of the other endpoint.

Fuel Cell System

Fuel cell systems, such as solid oxide fuel cell (SOFC) systems may be configured to operate most efficiently using natural gas as fuel. However, natural gas and other fuel sources may include contaminants, such as sulfur species. For example, natural gas may be contaminated with sulfur species such as, hydrogen sulfide ($H_2S$), t-butyl mercaptan ($C_4H_{10}S$), tetrahydrothiophene ($C_4H_8S$), or the like. Generally, prior to being supplied to a fuel cell stack, fuel is filtered through one or more sorbent beds to prevent such contaminants from poisoning fuel cell catalysts.

The present inventors have discovered that metal oxides, such as ZnO, can be heated to sulfur adsorption temperatures using heat from a fuel cell system.

Figure 1:
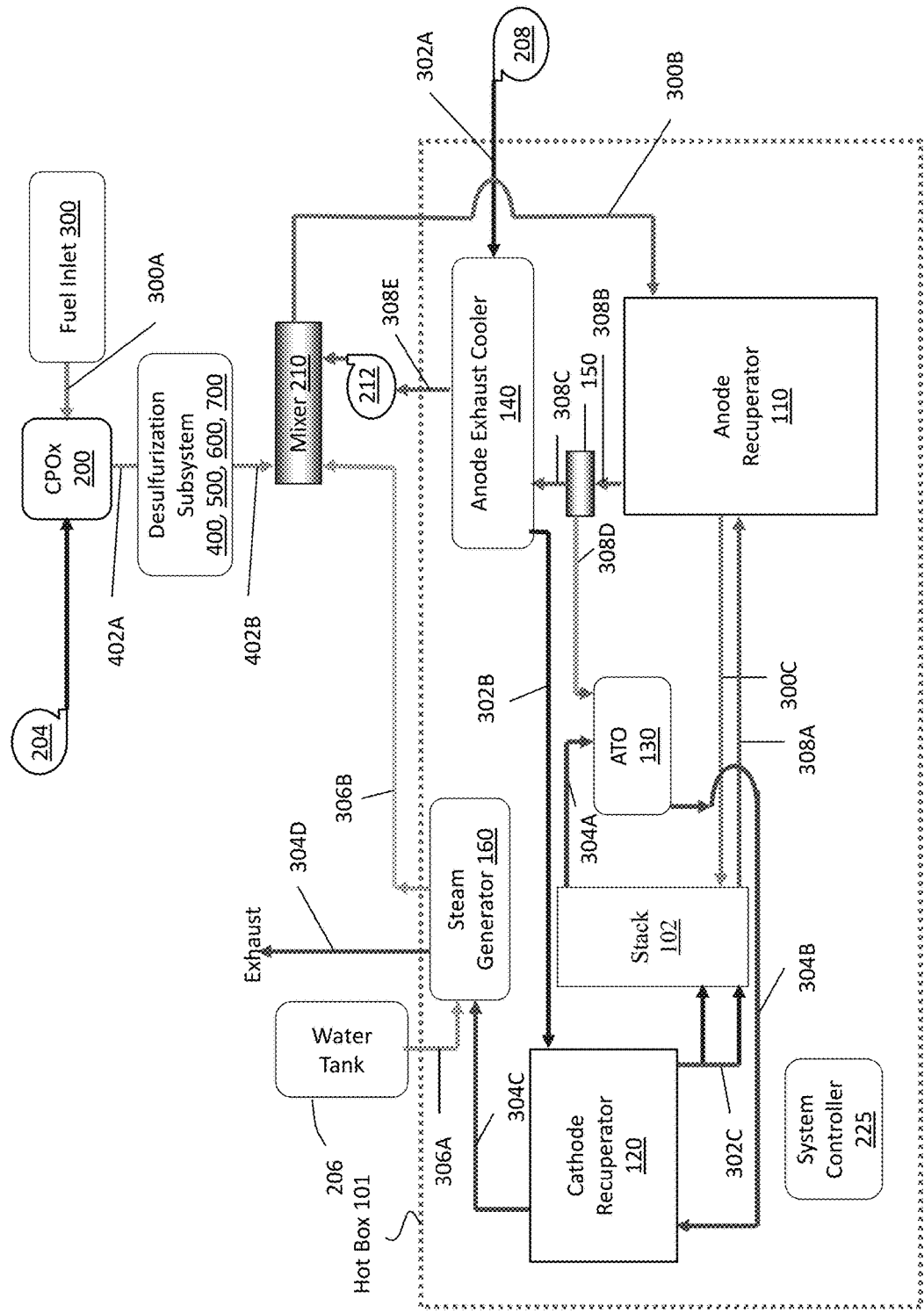
FIG. 1 is a schematic view of a SOFC system including a desulfurization subsystem, according to various embodiments of the present disclosure.

FIG. 1 is a schematic representation of a fuel cell system, such as a SOFC system 100, according to various embodiments of the present disclosure. Referring to FIG. 1, the system 100 includes a hot box 101 and various components disposed therein or adjacent thereto.

The hot box 101 may contain fuel cell stacks 102, such as a solid oxide fuel cell stacks (where one solid oxide fuel cell of the stack contains a ceramic electrolyte, such as yttria-stabilized zirconia (YSZ), scandia-stabilized zirconia (SSZ), or ceria-ytterbia (SSZ), an anode electrode, such as a nickel-YSZ, nickel-SSZ, or nickel-samaria doped ceria cermet, and a cathode electrode, such as lanthanum strontium manganite (LSM)). The stacks 102 may be arranged over each other in a plurality of columns.

The hot box 101 may also contain an anode recuperator 110, a cathode recuperator 120, an anode tail gas oxidizer (ATO) 130, an optional anode exhaust cooler 140, a splitter 150, and a steam generator 160. The system 100 may also include a catalytic partial oxidation (CPOx) reactor 200, a mixer 210, a CPOx blower 204, a main air blower 208, and an anode blower 212, and a high-temperature desulfurization subsystem 400, 500, 600, or 700, which may be disposed outside of the hot box 101. However, the present disclosure is not limited to any particular location for each of the components with respect to the hot box 101.

The CPOx reactor 200 receives a fuel inlet stream from a fuel inlet 300 such as a natural gas fuel from a natural gas pipeline, through fuel conduit 300A. The CPOx blower 204 may provide air to the CPOx reactor 200. During a cold startup, the fuel is partially oxidized in the CPOx reactor 200 by injection of air from the CPOx blower 204. The CPOx reactor 200 may include a glow plug to initiate this catalytic reaction. During this cold-start operational mode, the CPOx reactor 200 may be operated at a temperature ranging from about 600° C. to about 800° C., such as from about 650° C. to about 750° C., or about 700° C. The CPOx blower 204 generally operates during startup, and is usually not operated during steady-state system operation.

The CPOx 200 may be fluidly connected to the desulfurization subsystem 400, 500, 600, or 700 by fuel conduit 300A, which may be fluidly connected to the mixer 210 by fuel conduit 300B. In the mixer 210, the fuel (i.e., the fuel inlet stream) may be mixed with steam and/or anode exhaust provided by anode exhaust conduit 308E from the anode exhaust cooler 140. Fuel flows from the mixer 210 to the anode recuperator 110, through fuel conduit 300B. Fuel flows from the anode recuperator 110 to the stack 102 through fuel conduit 300C.

The desulfurization subsystem may be configured to heat fuel and/or one or more zinc oxide desulfurization beds included therein. Exemplary desulfurization subsystems 400, 500, 600, or 700 are described in detail below with regard to FIGS. 2-5.

The main air blower 208 may be configured to provide an air inlet stream to the anode exhaust cooler 140 through air conduit 302A. Air flows from the anode exhaust cooler 140 to the cathode recuperator 120 through air conduit 302B. The air flows from the cathode recuperator 120 to the stack 102 through air conduit 302C.

Anode exhaust generated in the stack 102 is provided to the anode recuperator 110 through anode exhaust conduit 308A. The anode exhaust may contain unreacted fuel in addition to CO, $CO_2$, $H_2$, and $H_2O$. As such, the anode exhaust may also be referred to herein as fuel exhaust. The anode exhaust is provided from the anode recuperator 110 to a splitter 150 by anode exhaust conduit 308B. A first portion of the anode exhaust may be provided from the splitter 150 to the anode exhaust cooler 140 by anode exhaust conduit 308C where heat from the anode exhaust is used to preheat the air inlet stream. A second portion of the anode exhaust may be provided from the splitter 150 to the ATO 130 by anode exhaust conduit 308D. The first portion of the anode exhaust may be provided from the anode exhaust cooler 140 to mixer 210 by anode exhaust conduit 308E. The anode recycle blower 212 may be configured to move the first portion of the anode exhaust though anode exhaust conduit 308E, as discussed below.

Cathode exhaust generated in the stack 102 flows to the ATO 130 through exhaust conduit 304A. Cathode exhaust and/or ATO exhaust generated in the ATO 130 flows from the ATO 130 to the cathode recuperator 120 through exhaust conduit 304B, where heat from the ATO exhaust is used to preheat the air inlet stream. ATO exhaust flows from the cathode recuperator 120 to the steam generator 160 through exhaust conduit 304C. Exhaust flows from the steam generator 160 and out of the hot box 101 through exhaust conduit 304D.

Water flows from a water source 206, such as a water tank or a water pipe, to the steam generator 160 through water conduit 306A. The steam generator 160 converts the water into steam using heat from the ATO exhaust provided by exhaust conduit 304C. Steam is provided from the steam generator 160 to the mixer 210 through water conduit 306B. Alternatively, if desired, the steam may be provided directly into the fuel inlet stream and/or the anode exhaust stream may be provided directly into the fuel inlet stream followed by humidification of the combined fuel streams. The mixer 210 is configured to mix the steam with anode exhaust and fuel. This fuel mixture may then be heated in the anode recuperator 110 by the heat from the anode exhaust, before being provided to the stack 102.

The anode recuperator 110 may optionally include various catalysts. For example, the anode recuperator 110 may include an oxidation catalyst configured to remove oxygen from the fuel, a hydrogenation catalyst configured to combine unsaturated hydrocarbons, such as ethylene and propylene (alkenes), with available hydrogen in the fuel, resulting in saturated hydrocarbons, and a reforming catalyst configured to partially reform the fuel before the fuel is delivered to the stack 102.

The system 100 may further include a system controller 225 configured to control various elements of the system 100. The controller 225 may include a central processing unit configured to execute stored instructions. For example, the controller 225 may be configured to control fuel and/or air flow through the system 100, by controlling the speed of the blower(s) 208, 212, and/or fuel flow rate from the fuel inlet 300 using a computer controlled valve.

High-Temperature Desulfurization Subsystems

Various embodiments provide high-temperature desulfurization subsystems that include a sulfur adsorption material, such as a metal oxide, that adsorbs sulfur species at high temperatures, such as temperatures above about 150° C., for example temperatures ranging from about 200° C. to about 450° C. Herein, such metal oxides are described with respect to zinc oxide (ZnO). However, the present disclosure is not limited thereto. For example, other suitable metal oxide sorbents include impregnated alumina sorbents, sodium and/or potassium containing alumina sorbents, nickel oxide-based sorbents, or the like may be used. Other suitable sorbents may include $Fe_2O_3$, CuO, $MnO_2$, $CeO_2$, $SnO_2$, or the like. In some embodiments, sorbents, such as Selexsorb CDX, Selexsorb COS, DP-20, DP-25, D1275, and SG 9201, from BASF Inc., or combinations thereof, may be suitable. In other embodiments, sorbents may include Sorbent HTZ-5 from Haldor Topsoe Inc, Sorbents 32-6 and 33-1 from Johnson-Matthey Inc., Sorbents G1 and S2 from Clariant Inc., Sorbents X1 and R2F from SulfaTrap, and Sorbent A310 from Alfa Aesar Inc. Alternatively, more than one adsorption material may be used, such as a combination of ZnO with one or more of alumina, nickel oxide, $Fe_2O_3$, CuO, $MnO_2$, $CeO_2$, or $SnO_2$ may be used, in a weight ratio of 1:4 to 4:1, such as 2:3 to 3:2, for example 1:1. Furthermore, other materials, such as a binder, etc., may be added to the metal oxide material.

The use of a metal oxide, such as zinc oxide, provides many benefits as compared to conventional, low temperature adsorption materials. For example, zinc oxide is relatively inexpensive and can adsorb more sulfur compounds on a weight to weight basis, as compared to conventional sulfur adsorption materials. Further, zinc oxide is a non-pyrophoric compound that does not adsorb hydrocarbons, and thus, is not considered hazardous waste due to the presence of hydrocarbons. Further, exhausted zinc oxide-based adsorption beds may be regenerated by oxidization processes e.g., by providing air to oxidize zinc sulfide to regenerate zinc oxide. This reaction is highly exothermic and does not require any additional thermal energy from the fuel cell system 100.

In order to adsorb sulfur species, a metal oxide, such as ZnO, included in a desulfurization reactor and/or fuel provided thereto may be maintained at a temperature ranging from about 200° C. to about 450° C. Accordingly, various exemplary embodiments provide desulfurization subsystems that are configured to heat fuel and/or a desulfurization reactor using various heat sources.

Figure 2:
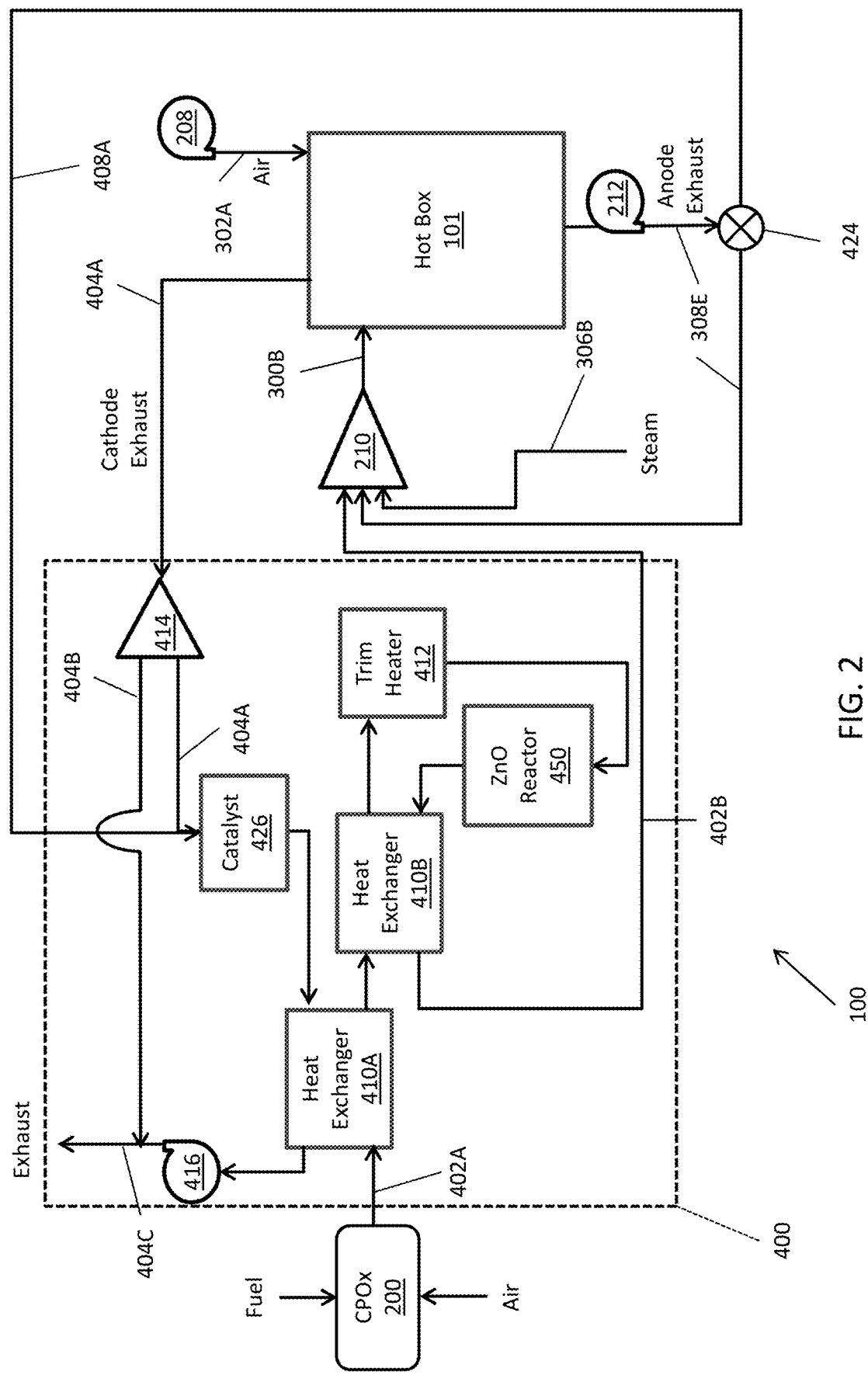
FIG. 2 is a schematic view of a desulfurization subsystem, according to various embodiments of the present disclosure.

FIG. 2 is a schematic diagram of a desulfurization subsystem 400 that may be included in the system 100, according to various embodiments of the present disclosure. Referring to FIGS. 1 and 2, the subsystem 400 may include a high-temperature desulfurization reactor 450 including a metal oxide such as ZnO, the fuel conduit 402A fluidly connecting the reactor 450 to the CPOx reactor 200, the fuel conduit 402B fluidly connecting the reactor 450 to the mixer 210, and a cathode heat exchanger 410A thermally connected to fuel conduit 402A.

The subsystem 400 may include a cathode exhaust conduit 404A thermally connected to the cathode heat exchanger 410A. Cathode exhaust conduit 404A may be configured to provide cathode exhaust from the hot box 101 to the cathode heat exchanger 410A. Cathode exhaust conduit 404A may be configured to receive cathode exhaust and/or ATO exhaust emitted from the stack 102, the ATO 130, and/or the cathode recuperator 120.

The cathode heat exchanger 410A may be configured to transfer heat from cathode exhaust and/or ATO exhaust in cathode exhaust conduit 404A to the fuel inlet stream in the fuel conduit 402A. For example, during steady-state operation, cathode exhaust and/or ATO exhaust having a temperature ranging from about 300° C. to about 500° C., such as from about 325° C. to about 450° C., and fuel that is approximately room temperature may be respectively provided to the cathode heat exchanger 410A by conduits 404A, 402A. Accordingly, the cathode heat exchanger 410A may operate to heat the fuel inlet stream to a temperature ranging from about 275° C. to about 500° C., such as about 300° C. to about 450° C.

The subsystem 400 may include a cathode exhaust blower 416. The cathode exhaust blower 416 may be configured to pull a desired amount of cathode exhaust from the hot box 101 and/or exhaust from the ATO 130, and through cathode exhaust conduit 404C. As such, the cathode exhaust blower 416 may allow for the cathode exhaust to be provided to the cathode heat exchanger 410A, without requiring an increase in the cathode exhaust pressure in the hot box 101.

In some embodiments, the subsystem 400 may optionally include a trim heater 412 and a fuel heat exchanger 410B. The fuel heat exchanger 410B may be configured to transfer heat from fuel exiting the reactor 450 to fuel entering the reactor 450. The trim heater 412 configured to heat the fuel inlet stream in fuel conduit 402A, prior to reaching the reactor 450. For example, the trim heater 412 may operate by combusting fuel in fuel conduit 402A, anode exhaust received from the hot box 101, or a combination thereof. In other embodiments, the trim heater 412 may include an electrical heating element. The trim heater 412 may be operated only during system startup, in some embodiments. In other embodiments, the trim heater 412 may be used to increase the temperature of the fuel inlet stream to the operating temperature, if necessary.

In various embodiments, the subsystem 400 may include a splitter 414 fluidly connected to cathode conduit 404A and to an exhaust bypass conduit 404B. The splitter 414 may be configured to divert some cathode exhaust and/or ATO exhaust into exhaust bypass conduit 404B and then out of the system via conduit 404C. For example, a portion of the cathode exhaust may be diverted to reduce system exhaust flow restriction. The remaining cathode and/or ATO exhaust may be provided into conduit 404A.

During system startup, the CPOx reactor 200 may be ignited to combust a mixture of fuel and air provided to the CPOx reactor 200. The heat generated by the combustion may be used to heat the reactor 450 and the hot box 101. It is believed that at lower temperatures sulfur species do not react with, and thereby poison, system catalysts. Accordingly, the reactor 450 may reach its operating temperature and begin adsorbing sulfur species, before sulfur species passing through the reactor can poison system catalysts.

During steady-state operation, the flow of air to the CPOx may be stopped to terminate the CPOx reaction. However, in some embodiments, during steady-state operation, a small amount of air (e.g., up to 1 vol %) may be provided to fuel in the CPOx reactor 200, without igniting the CPOx reactor 200. This small amount of air may oxidize sulfur species such as t-butyl mercaptan, tetrahydrothiophene, dimethyl sulfide, etc., which may improve the adsorption efficiency the ZnO reactor 450.

In some embodiments, the subsystem 400 may include the cathode heat exchanger 410A and one or both of the fuel heat exchanger 410B and the trim heater 412 may be omitted. In other embodiments, the system may include both heat exchangers 410A, 410B, and may include or omit the trim heater 412.

The subsystem 400 may optionally include a valve or splitter 424 disposed on anode exhaust conduit 308E, an anode exhaust conduit 408A, and an oxidation catalyst 426. The oxidation catalyst may be fluidly connected to cathode conduit 404A. Anode exhaust conduit 408A may be configured to provide anode exhaust to the oxidation catalyst 426 and/or to cathode exhaust conduit 404A upstream of the oxidation catalyst 426. The oxidation catalyst 426 may be disposed on cathode conduit 404A, so as to receive both anode and cathode exhaust. The valve 424 may be a proportional valve, such as a proportional solenoid valve configured to divert all or a portion of anode exhaust in anode exhaust conduit 308E into anode exhaust conduit 408A. The oxidation catalyst 426 may be configured to catalyze an oxidation reaction between the cathode and anode exhaust.

Heat from the anode and cathode exhaust oxidation reaction may be transferred to the fuel inlet stream in fuel conduit 402A by the cathode heat exchanger 410A. Accordingly, the fuel inlet stream may be heated to a higher temperature than if the fuel were heated using only cathode or ATO exhaust.

Figure 3:
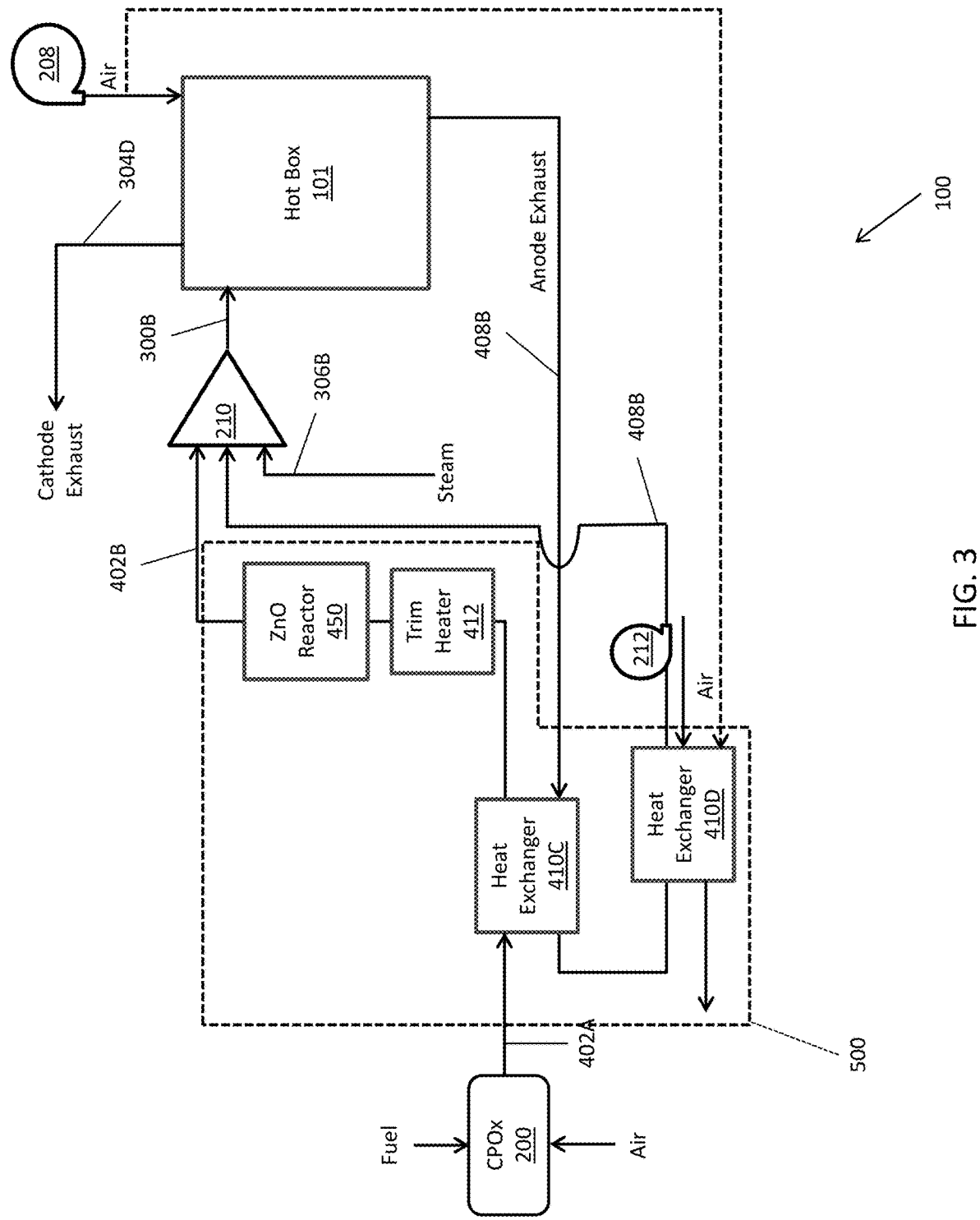
FIG. 3 is a schematic view of a desulfurization subsystem, according to various embodiments of the present disclosure.

FIG. 3 is a schematic view of a desulfurization subsystem 500 that may be included in the system 100, according to various embodiments of the present disclosure. The subsystem 500 may include similar components as the subsystem 400, so only the differences therebetween will be discussed in detail.

Referring to FIGS. 1 and 3, the subsystem 500 may include an anode exhaust conduit 408B, an anode heat exchanger 410C, and a cabinet heat exchanger 410D, which may be fluidly connected to the anode recycle blower 212. Anode exhaust conduit 408B may be thermally and/or fluidly connected to the heat exchangers 410C, 410D, and may be configured to receive anode exhaust from the hot box 101. For example, anode exhaust conduit 408B may be configured to receive anode exhaust from the splitter 150, the anode exhaust cooler 140, or to the anode recuperator 110. The anode heat exchanger 410C may be configured to heat the fuel inlet stream in fuel conduit 402A using anode exhaust pulled from the hot box 101 through anode exhaust conduit 408B by the anode recycle blower 212. The anode recycle blower 212 may be located downstream of the heat exchangers 410C, 410D. In an alternative embodiment, heat exchanger 410D could also be cooled with air from the system air blower 208 instead of or in addition to cabinet air. In this alternative embodiment, an additional heat exchanger (not shown) may be disposed between heat exchangers 410C and 410D, or downstream of heat exchanger 410D.

During steady-state operation, the anode heat exchanger 410C may receive hot anode exhaust having a temperature ranging from about 450° C. to about 550° C., such as about 500° C. The hot anode exhaust may be sufficient to heat the fuel inlet stream from about room temperature to a temperature ranging from about 400° C. to about 500° C., such as about 450° C. The heated fuel inlet stream may be directed to the reactor 450, which may be maintained at an operating temperature ranging from about 200° C. to about 450° C., such as from about 250° C. to about 400° C., due to the heated fuel inlet stream passing through the reactor 450. The reactor 450 may adsorb sulfur species from the fuel. The desulfurized fuel may then be provided to the hot box 101, as discussed above.

The anode heat exchanger 410C may also operate to cool the anode exhaust, such that anode exhaust exiting the anode heat exchanger 410C may have a temperature ranging from about 350° C. to about 450° C., such as about 385° C. The anode exhaust may then be provided to the cabinet heat exchanger 410D, where the anode exhaust may be cooled to a temperature ranging from about 150° C. to about 250° C., such as from about 175° C. to about 200° C. The cabinet heat exchanger 410D may be located outside of the hot box 101, such as in a system cabinet containing the hot box 101, may include a variable speed fan, and may be configured to cool the anode exhaust using air outside of the hot box 101, such as air inside the system cabinet.

The anode exhaust may be mixed in the mixer 210 with the fuel provided from the reactor 450, and the mixture may have a temperature ranging from about 200° C. to about 300° C., such as about 250° C. Accordingly, the size of the anode recuperator 110 may be reduced, as compared to a conventional anode recuperator that receives a fuel mixture having a temperature of about 120° C. In some embodiments, heat exchangers 410C, 410D may cool the anode exhaust to a low enough temperature to prevent damage to the anode recycle blower 212. Therefore, the anode exhaust cooler 140 may be reduced in size or omitted in this embodiment, such that the air inlet stream is not preheated by the anode exhaust. As a result, the subsystem 500 may provide cost savings, space reduction, and a reduction in fuel pressure drop.

Figure 4:
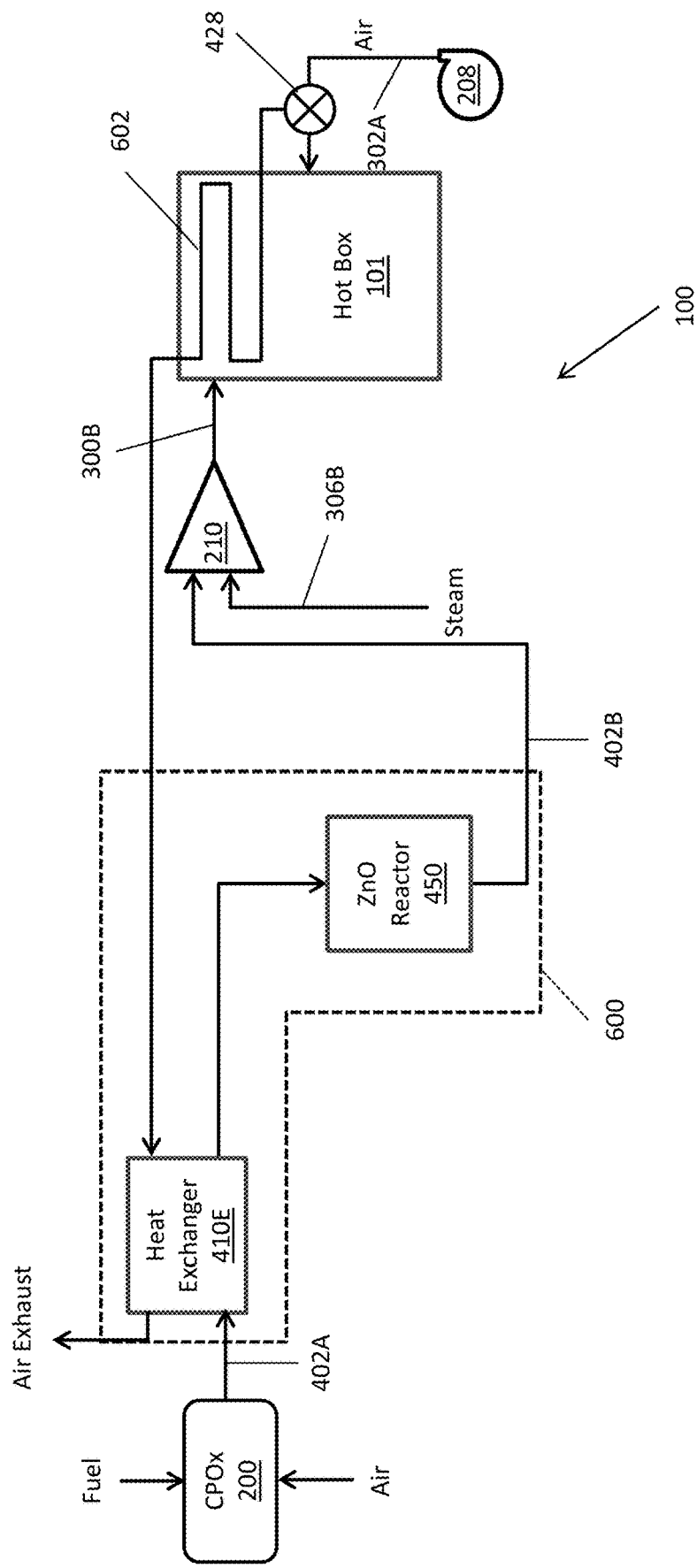
FIG. 4 is a schematic view of a desulfurization subsystem, according to various embodiments of the present disclosure.

FIG. 4 is a schematic view of a desulfurization subsystem 600 that may be included in the system 100, according to various embodiments of the present disclosure. The subsystem 600 may include similar components as the subsystems 400 and 500, so only the differences therebetween will be discussed in detail.

Referring to FIGS. 1 and 4, the subsystem 600 may include a splitter or valve 428 disposed on air conduit 302A, an air heat exchanger 410E, and an air conduit 602 fluidly connected to the valve 428 and fluidly and/or thermally connected the air heat exchanger 410E. The valve 428 may be a proportional valve, such as a proportional solenoid valve. Air conduit 602 may be disposed within a unishell insulation layer of the hot box 101, such that air in air conduit 602 is heated by the hot box 101. For example, the air conduit 602 may be wrapped around the hot box 101 or may form a serpentine pattern to increase heat transfer with respect to the hot box 101. The valve 428 provides a first portion of the air inlet stream from the air blower 208 into conduit 602 and provides a remainder of the air inlet stream to the anode exhaust cooler 140.

The air heat exchanger 410E may be configured to heat fuel in fuel conduit 402A using heated air received from air conduit 602. Since the air is heated by the hot box 101, the air may be heated to a higher temperature than the temperature of the cathode exhaust. As such, the air heat exchanger 410E may be capable of heating the fuel to a higher temperature than what is possible using cathode exhaust, such as a temperature ranging from about 350° C. to about 450° C., such as a temperature of about 400° C.

Figure 5:
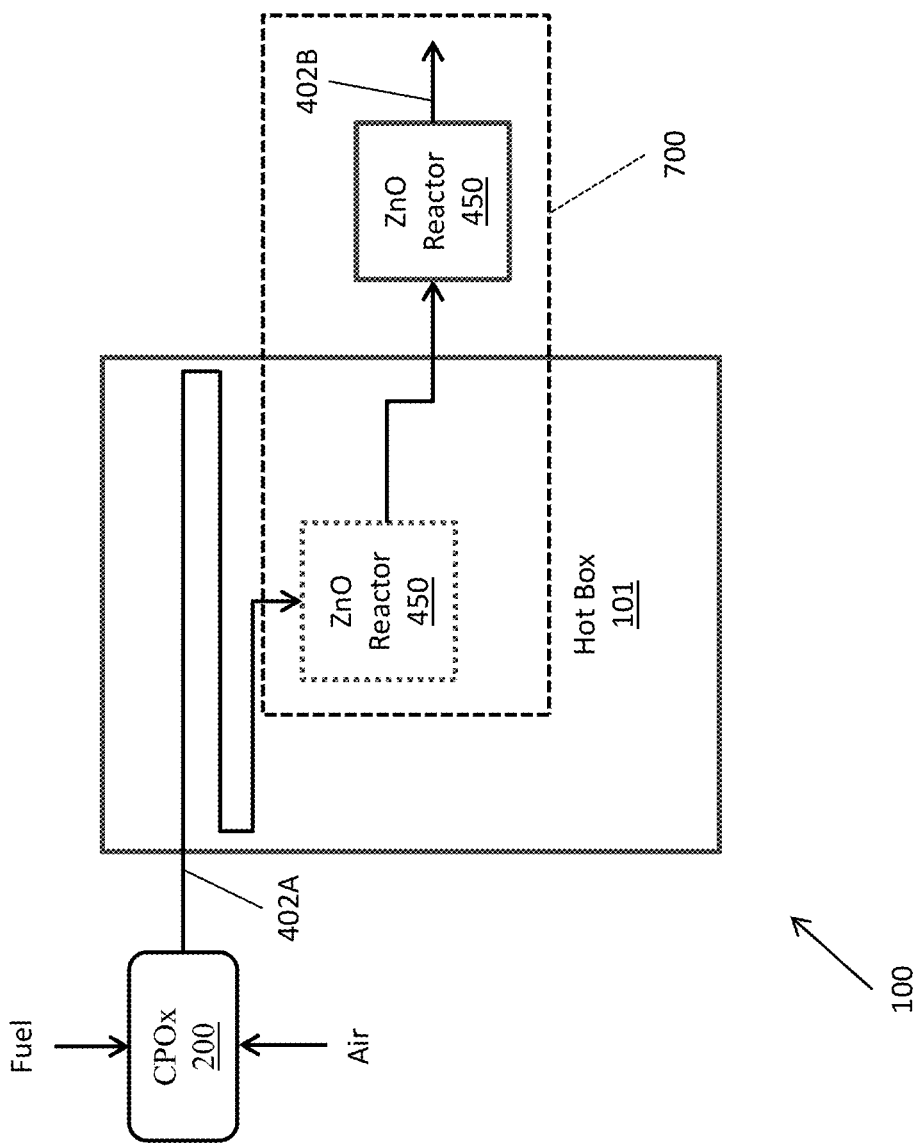
FIG. 5 is a schematic view of a desulfurization subsystem, according to various embodiments of the present disclosure.

FIG. 5 is a schematic view of a desulfurization subsystem 700 that may be included in the system 100, according to various embodiments of the present disclosure. The subsystem 700 may include similar components as the subsystems 400, 500, 600, so only the differences therebetween will be discussed in detail.

Referring to FIG. 5, the subsystem 700 may include fuel conduit 402A, which may be disposed within a unishell insulation layer of the hot box 101, such that fuel in fuel conduit 402A is heated by the hot box 101. For example, fuel conduit 402A may be wrapped around the hot box 101 and/or may form a serpentine pattern in the hot box 101, to increase heat transfer with respect to the hot box 101.

Fuel conduit 402A may be configured to heat fuel flowing therein, to provide heated fuel to the reactor 450. The reactor 450 may be disposed outside of the hot box 101. In other embodiments, the reactor 450 may be disposed within the unishell insulation, as indicated by the dotted lines.

FIG. 6A is a schematic diagram of a reactor 450A, according to various embodiments of the present disclosure.

Referring to FIG. 6A, the reactor 450A may include an adsorption bed 452 fluidly connected to fuel conduits 402A, 402B.

During operation, ZnO in the adsorption bed 452 may be converted to zinc sulfide, by the adsorption of sulfur species. When the adsorption bed 452 reaches a sulfur saturation limit, a regeneration operation may be performed. For example, the in the adsorption bed 452 may be regenerated in situ by stopping the fuel flow through the adsorption bed 452, while providing air to the reactor 450A. The air may be provided by the CPOx blower 204 of the CPOx reactor 200, for example. The air and/or the reactor 450A may be maintained at a temperature ranging from about 500° C. to about 600° C. during the exothermic regeneration reaction, such that the zinc sulfide is oxidized to regenerate ZnO. Fuel flow to the fuel cell system may be stopped or bypassed around the adsorption bed 452 using a bypass valve and conduit. For example, during system shutdown the system output current may be turned off and the fuel flow to the fuel cell system is stopped.

Since fuel heating is not required during regeneration, the cathode exhaust, anode exhaust, or heated air respectively provided to heat exchangers 410B, 410C, or 410D may be reduced, for example, to a rate ranging from about 200 to about 400 standard liters per minute (SLPM), such as about 300 SLPM. Once the adsorption bed 452 is regenerated, normal system operation may resume.

Figure 6B:
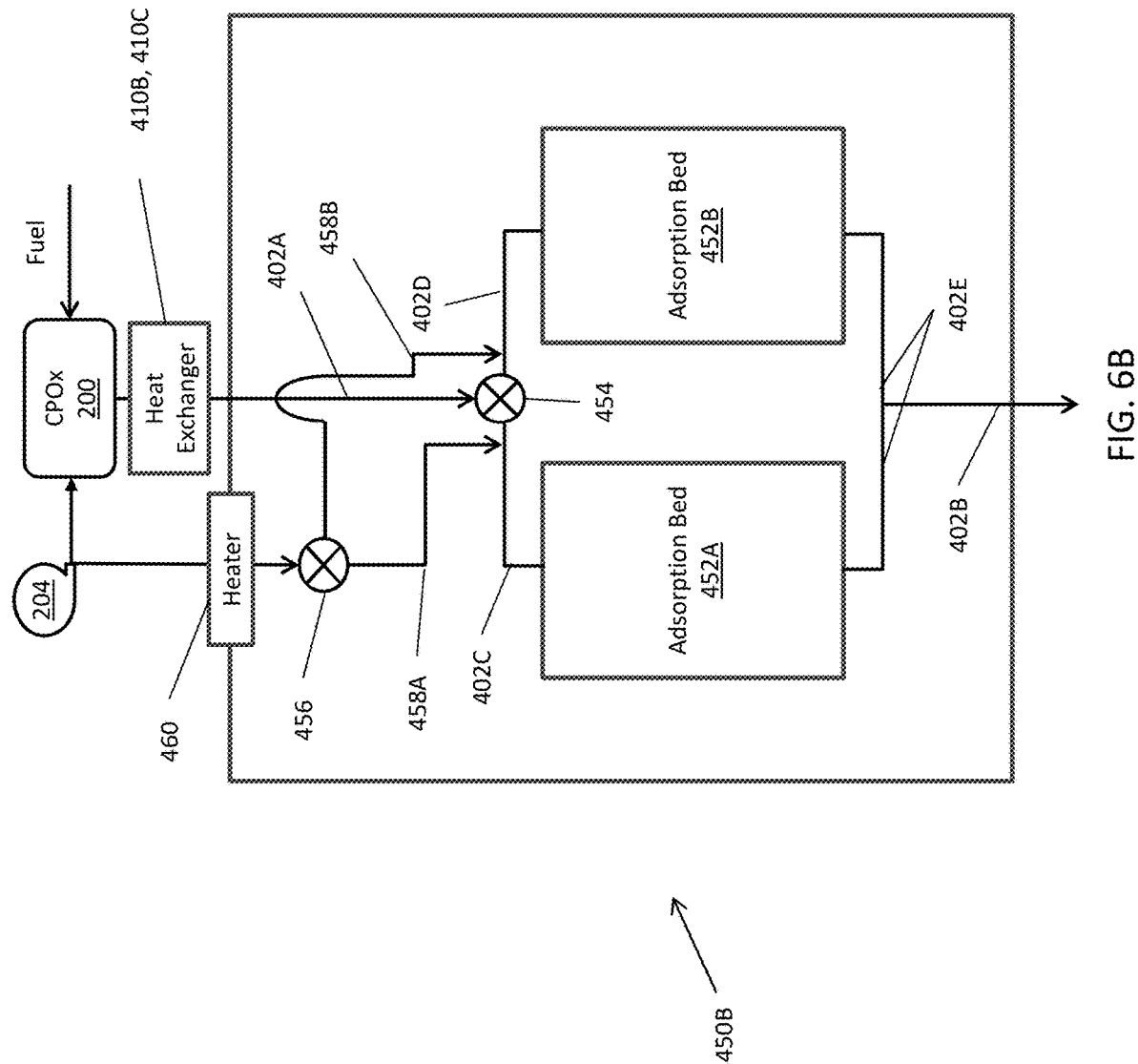

FIG. 6B is a schematic diagram of a sulfur adsorption reactor 450B, according to other embodiments of the present disclosure. Referring to FIG. 6B, the reactor 450B may include first and second adsorption beds 452A, 452B, and at least one fuel valve 454 connected to fuel conduit 402A. However, the reactor 450B may include three or more adsorption beds in some embodiments. The reactor 450B may also include fuel inlet conduits 402C, 402D respectively fluidly connected to the adsorption beds 452A, 452B, and the fuel valve 454, which may be a 3-way valve or which may include two two-way valves. Fuel flow through fuel inlet conduits 402C, 402D may be controlled by adjusting the fuel valve 454. The reactor 450B may also include fuel outlet conduits 402E configured to receive purified fuel from the adsorption beds 452A, 452B. Fuel outlet conduits 402E may be fluidly connected to fuel conduit 402B.

The reactor 450B may optionally include an air valve 456 fluidly connected to an air source, such as the CPOx blower 204, and air conduits 458A, 458B fluidly connected to the air valve 456. Air conduits 458A, 458B may also be fluidly connected to fuel conduits 402C, 402D, or may be directly connected to inlets of corresponding adsorption beds 452A, 452B.

During operation, fuel may be provided to one of the adsorption beds 452A, 452B, such as the first adsorption bed 452A via fuel conduit 402C, until the first adsorption bed 452A approaches a sulfur adsorption limit (e.g., is substantially converted to zinc sulfide). The fuel valve 454 may then be adjusted to provide fuel to the second adsorption bed 452B via fuel conduit 402D, and to stop the flow of fuel to the first adsorption bed 452A through fuel conduit 402C.

Air may be supplied to the first adsorption bed 452A such that the first adsorption bed 452A may be regenerated, while fuel flows to the second adsorption bed 452B. For example, the air valve 456 may be adjusted such that air is provided by the CPOx blower 204 to the first adsorption bed 452A, via air conduit 458A. Air may be provided at a rate ranging from about 10 to about 30 SLPM, such as about 20 SLPM. However, air may be provided from any suitable source, such as system blower 208, or a dedicated regeneration blower (not shown). In an alternative embodiment, cathode exhaust may be provided instead of air from the CPOx blower 204 and/or some anode exhaust may be provided into the air for smoother temperature transitions.

The air and/or the reactor 450B may be maintained at a temperature ranging from about 500° C. to about 600° C. during the exothermic regeneration reaction, such that the zinc sulfide is oxidized to generate ZnO. In one embodiment, the reactor 450B may include an optional regeneration heater 460 configured to heat the air provided from the CPOx blower 204. In other embodiments, the adsorption beds 452A, 452B may each include an optional heating element, such as an electric heating element. Such a heating element(s) may be operated to initiate the regeneration of ZnO if the reactor 450B bed has cooled below the auto-ignition point for ZnS.

Once the first adsorption bed 452A is regenerated, the process may be reversed, such that fuel flows through the first adsorption bed 452A and the second adsorption bed 452B is regenerated. In other embodiments where the reactor 450B includes three or more adsorption beds, one adsorption bed may be used to purify fuel while the other adsorption beds are regenerated.

According to other embodiments, during steady-state operation, the CPOx blower 204 may be operated to provide a relatively small amount of air to the CPOx reactor 200 in addition to the fuel inlet stream. The amount of air provided may be sufficient to oxidize mercaptan, THT and/or DMS present in the fuel inlet stream.

According to various embodiments of the present disclosure, provided are high-temperature sulfur adsorption reactors that include zinc oxide adsorption beds that adsorb a much higher weight of sulfur species than and may be serviced much less frequently than conventional desulfurization materials. In some embodiments, high-temperature sulfur adsorption reactors may be configured to operate for the service lifetime of a fuel cell stack, such that no replacement is required.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell system comprising:
   a hot box;
   a stack of fuel cells disposed in the hot box; and
   a desulfurization subsystem comprising:
   a sulfur adsorption reactor comprising a metal oxide configured to adsorb sulfur species from fuel; and
   a first fuel conduit configured to provide fuel to the reactor,
   wherein the subsystem is configured to heat the reactor to an operating temperature ranging from about 200° C. to about 450° C., using heat generated in the hot box;
   wherein the subsystem further comprises:
   a cathode exhaust conduit configured to receive at least one of cathode exhaust or anode tail gas oxidizer (ATO) exhaust from the hot box; and a cathode heat exchanger configured to transfer heat from the at least one of the cathode exhaust or the ATO exhaust in the cathode exhaust conduit to fuel in the first fuel conduit.

2. The system of claim 1, wherein the subsystem further comprises a fuel heat exchanger configured to transfer heat from fuel in a second fuel conduit to fuel in the first fuel conduit.

3. The system of claim 2, wherein the subsystem further comprises a trim heater configured to heat fuel in the first fuel conduit.

4. The system of claim 3, wherein the cathode heat exchanger is disposed upstream of the fuel heat exchanger, and the fuel heat exchanger is disposed upstream of the trim heater, with respect to a fuel flow direction through the first fuel conduit to the reactor.

5. The system of claim 1, wherein the subsystem further comprises:
an anode exhaust conduit configured to provide anode exhaust from the hot box to the cathode exhaust conduit; and
an oxidation catalyst configured to catalyze oxidation of a mixture of anode exhaust and cathode exhaust in the cathode exhaust conduit.

6. The system of claim 1, wherein the subsystem further comprises:
a bypass conduit; and
a splitter configured to divert a portion of cathode exhaust or the ATO exhaust in the cathode exhaust conduit into the bypass conduit.

7. The system of claim 1, wherein the subsystem further comprises a cathode blower configured to pull cathode exhaust or ATO exhaust from the hot box through the cathode exhaust conduit.

8. A fuel cell system comprising:
a hot box;
a stack of fuel cells disposed in the hot box; and
a desulfurization subsystem comprising:
a sulfur adsorption reactor comprising a metal oxide configured to adsorb sulfur species from fuel; and
a first fuel conduit configured to provide fuel to the reactor,
wherein the subsystem is configured to heat the reactor to an operating temperature ranging from about 200° C. to about 450° C., using heat generated in the hot box;
wherein the subsystem further comprises:
an anode exhaust conduit configured to receive anode exhaust from the hot box; and
an anode heat exchanger configured to transfer heat from anode exhaust in the anode exhaust conduit to fuel in the first fuel conduit;
wherein the subsystem further comprises a trim heater configured to heat fuel in the first fuel conduit, wherein the trim heater is disposed downstream of the anode heat exchanger, with respect to a fuel flow direction through the first fuel conduit to the reactor.

9. A fuel cell system comprising:
a hot box;
a stack of fuel cells disposed in the hot box; and
a desulfurization subsystem comprising:
a sulfur adsorption reactor comprising a metal oxide configured to adsorb sulfur species from fuel; and
a first fuel conduit configured to provide fuel to the reactor,
wherein the subsystem is configured to heat the reactor to an operating temperature ranging from about 200° C. to about 450° C., using heat generated in the hot box;
wherein the subsystem further comprises:
an air conduit thermally connected to the hot box, such that air in the air conduit is heated by heat generated in the hot box;
an air heat exchanger configured to transfer heat from air in the air conduit to fuel in the first fuel conduit; and
a blower configured to force air through the air conduit.

10. The system of claim 9, wherein the air conduit is disposed between the hot box and an insulation layer covering the hot box.

11. A fuel cell system comprising:
a hot box;
a stack of fuel cells disposed in the hot box; and
a desulfurization subsystem comprising:
a sulfur adsorption reactor comprising a metal oxide configured to adsorb sulfur species from fuel; and
a first fuel conduit configured to provide fuel to the reactor,
wherein the subsystem is configured to heat the reactor to an operating temperature ranging from about 200° C. to about 450° C., using heat generated in the hot box;
wherein the first fuel conduit is disposed between the hot box and an insulation layer covering the hot box, such that fuel in the first fuel conduit is heated by heat generated in the hot box.

12. The system of claim 11, wherein the reactor is disposed between the hot box and an insulation layer covering the hot box, such that the reactor is heated by heat generated in the hot box.

13. A fuel cell system comprising:
a hot box;
a stack of fuel cells disposed in the hot box; and
a desulfurization subsystem comprising:
a sulfur adsorption reactor comprising a metal oxide configured to adsorb sulfur species from fuel; and
a first fuel conduit configured to provide fuel to the reactor,
wherein the subsystem is configured to heat the reactor to an operating temperature ranging from about 200° C. to about 450° C., using heat generated in the hot box;
wherein:
the reactor comprises an adsorption bed comprising ZnO; and
the system further comprises a catalytic partial oxidation (CPOx) reactor configured to provide fuel to the first fuel conduit during steady-state system operation, and to provide only air to the first conduit after system shutdown to regenerate the ZnO adsorption bed.

14. A fuel cell system comprising:
a hot box;
a stack of fuel cells disposed in the hot box; and
a desulfurization subsystem comprising:
a sulfur adsorption reactor comprising a metal oxide configured to adsorb sulfur species from fuel; and
a first fuel conduit configured to provide fuel to the reactor,
wherein the subsystem is configured to heat the reactor to an operating temperature ranging from about 200° C. to about 450° C., using heat generated in the hot box;
wherein the reactor comprises:

first and second adsorption beds comprising ZnO;
a fuel valve configured to selectively direct fuel from the first fuel conduit into one of the first and second adsorption beds; and
an air valve configured to selectively direct air from an air conduit into one of the first and second adsorption beds, wherein the fuel and air valves are configured such that air and fuel is not directed into the same adsorption bed;
wherein:
the system comprises a catalytic partial oxidation (CPOx) reactor configured to provide fuel to the first fuel conduit;
the CPOx reactor comprises a blower configured to provide air to the air conduit; and
the reactor comprises a heater configured to heat air in the air conduit.

* * * * *